United States Patent
Fannin (10) Patent No.: US 11,866,009 B2
(45) Date of Patent: Jan. 9, 2024

(54) UNIVERSAL ORGANIZATION SYSTEM FOR VEHICULAR CARGO AREAS

(71) Applicant: Christopher Fannin, Orlando, FL (US)

(72) Inventor: Christopher Fannin, Orlando, FL (US)

(*) Notice: Subject to any disclaimer, the term of this patent is extended or adjusted under 35 U.S.C. 154(b) by 130 days.

(21) Appl. No.: 17/738,969

(22) Filed: May 6, 2022

(65) Prior Publication Data

US 2022/0363198 A1 Nov. 17, 2022

Related U.S. Application Data

(60) Provisional application No. 63/188,181, filed on May 13, 2021.

(51) Int. Cl.
*B60R 5/04* (2006.01)

(52) U.S. Cl.
CPC ..................... *B60R 5/04* (2013.01)

(58) Field of Classification Search
CPC ........................................ B60R 5/04
USPC ............................................ 224/539
See application file for complete search history.

(56) References Cited

U.S. PATENT DOCUMENTS

| | | | | |
|---|---|---|---|---|
| 5,289,941 | A * | 3/1994 | Blankenburg | B60R 7/02 206/821 |
| 5,597,193 | A * | 1/1997 | Conner | B60P 7/14 410/112 |
| 5,845,953 | A * | 12/1998 | Rusnock | B60P 7/0892 296/37.6 |
| 6,077,007 | A * | 6/2000 | Porter | B60P 7/15 410/121 |
| 6,688,821 | B1 * | 2/2004 | Snyder | B60P 7/14 410/151 |
| 6,890,138 | B1 * | 5/2005 | Myrick | B60P 7/0892 410/97 |
| 8,029,219 | B2 * | 10/2011 | Toutant | B60P 7/14 410/129 |
| 8,317,442 | B2 * | 11/2012 | Daikuzono | B60P 7/14 410/121 |
| 8,683,769 | B2 * | 4/2014 | Cerny | E04F 15/02194 52/584.1 |
| 9,067,521 | B1 * | 6/2015 | Masanek, Jr. | B65D 11/22 |
| 9,227,570 | B2 * | 1/2016 | Fleet, Sr. | B60R 7/02 |
| 10,557,275 | B2 * | 2/2020 | Lescord | E04G 1/36 |
| 11,084,411 | B2 * | 8/2021 | Flanagan | B60P 1/6409 |

(Continued)

*Primary Examiner* — Peter N Helvey
(74) *Attorney, Agent, or Firm* — Jason T. Daniel, Esq.; Daniel Law Offices, P.A.

(57) ABSTRACT

An organizational system includes a plurality of straight divider segments having a plurality of upper protrusions and lower openings. Divider segments are aligned serially and are connected by lowering another divider segment onto the adjacent segments to form an elongated wall. A central channel on the top surface of each divider segment receives a bar on the bottom end of another divider segment when connected. The system also includes plurality of corner segments each having a top surface with an extended portion having a plurality of upper protrusions and lower openings. The corner segment is positioned orthogonally against one of the straight divider segments and the protrusions on the straight divider segment engage the openings on the extended section of the corner segment. An elongated bar on the bottom portion of the extended section is positioned within a cross channel on the straight divider segment in the connected orientation.

11 Claims, 11 Drawing Sheets

(56) References Cited

U.S. PATENT DOCUMENTS

| | | | |
|---|---|---|---|
| 2008/0101884 A1* | 5/2008 | Schmeichel | B60P 7/08 |
| | | | 410/121 |
| 2008/0169674 A1* | 7/2008 | Giles | B60P 7/0892 |
| | | | 296/183.1 |
| 2009/0226277 A1* | 9/2009 | Hill | B61D 45/006 |
| | | | 410/130 |
| 2015/0307016 A1* | 10/2015 | Payne | B60P 7/14 |
| | | | 410/129 |
| 2016/0214539 A1* | 7/2016 | Huebner | B60R 7/02 |
| 2018/0051473 A1* | 2/2018 | Lescord | E04G 7/02 |
| 2018/0194293 A1* | 7/2018 | Loew | B60R 7/02 |
| 2020/0307463 A1 | 10/2020 | Adams | |
| 2022/0055542 A1* | 2/2022 | Kane | B60R 11/06 |

\* cited by examiner

UNIVERSAL ORGANIZATION SYSTEM FOR VEHICULAR CARGO AREAS

CROSS-REFERENCE TO RELATED APPLICATIONS

This application claims the benefit of U.S. Application Ser. No. 63/188,181 filed on May 13, 2021, the contents of which are incorporated herein by reference.

TECHNICAL FIELD

The present invention relates generally to vehicular accessories, and more particularly to an organization system for the cargo area of a car, van, or truck.

BACKGROUND

The statements in this section merely provide background information related to the present disclosure and may not constitute prior art.

Modern motor vehicles typically have a dedicated cargo area for receiving and transporting items. This cargo area can take many different forms and configurations such as a carpeted flat floor in the back of a sport utility vehicle, a trunk area of a car and the bed area of a pickup truck. In either instance, these cargo areas typically comprise a large generally flat area for receiving a wide variety of large and small items alike.

With this in mind, there are no shortage of commercially available devices for use in organizing these cargo areas. In most instances, these devices are manufactured in a complete or semi-complete configuration having a specific shape and size that is designed for use with a particular make or model vehicle. As a result, such devices provide virtually no way for the end user to customize the shape, size or configuration of the device to accommodate different articles being transported and/or to allow the organization device to be used in different types of vehicles.

Accordingly, it would be beneficial to provide an organization system for vehicular cargo areas that can be used with virtually any type of vehicle and that can be quickly and easily customized by the end user so as to overcome the drawbacks described above.

SUMMARY OF THE INVENTION

The present invention is directed to a universal organization system for vehicular cargo areas. One embodiment of the present invention can include a plurality of straight divider segments each having a first end, a second end, a top end having a plurality of protrusions and a plurality of openings positioned beneath each protrusion. Each of the plurality of straight divider segments can be aligned serially and adjoining segments can be connected together by another straight divider segment by lowering the upper straight divider segment until the protrusions of the adjacent segments are disposed within the openings on the upper straight divider segment.

In one embodiment, each of the straight divider segments can include a central channel extending from the first end to the second end, and a plurality of cross channels extending perpendicular to the central channel. Each straight divider segment can also include an elongated bar that is positioned along a bottom surface of the top end at a location beneath the central channel. When joined together, the bar of the upper divider segment is positioned within the channels of the adjacent lower divider segments.

The system can also include plurality of corner divider segments each having a first end, a second end, a top end having a first plurality of protrusions and bottom openings, and an extended portion having a second plurality of protrusions and bottom openings that extend outward from the first end. The first end of each corner divider segment can be positioned against the side of a straight divider segment and the openings on the extended portion can be lowered onto the protrusions of the straight divider segment to secure the sections perpendicularly.

In one embodiment, each of the corner divider segments can include a first central channel extending from the first end to the second end, and a second central channel extending along the extended portion. Each corner divider segment can also include a first elongated bar that is positioned along a bottom surface of the top end at a location beneath the first central channel, and a second elongated bar that is positioned along a bottom surface of the extended portion of the top end beneath the second channel. When joined onto a straight divider segment, the second bar is positioned within one of the cross channels.

Connectors such as magnets and metallic strips can be located within and along the bars and channels to prevent inadvertent separation of the system components.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include opposing strips of hook and loop material (i.e. Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "stackingly engage" and derivatives thereof refers to the method whereby the protrusion openings and/or bar portion one divider section 20 or 30 is positioned above and lowered onto the protrusions and channels of another divider section 20 or 30 in order to connect the segments together in either a straight/serial orientation or in a perpendicular/orthogonal orientation.

FIGS. 1-7 illustrate one embodiment of a universal organization system for vehicular cargo areas 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
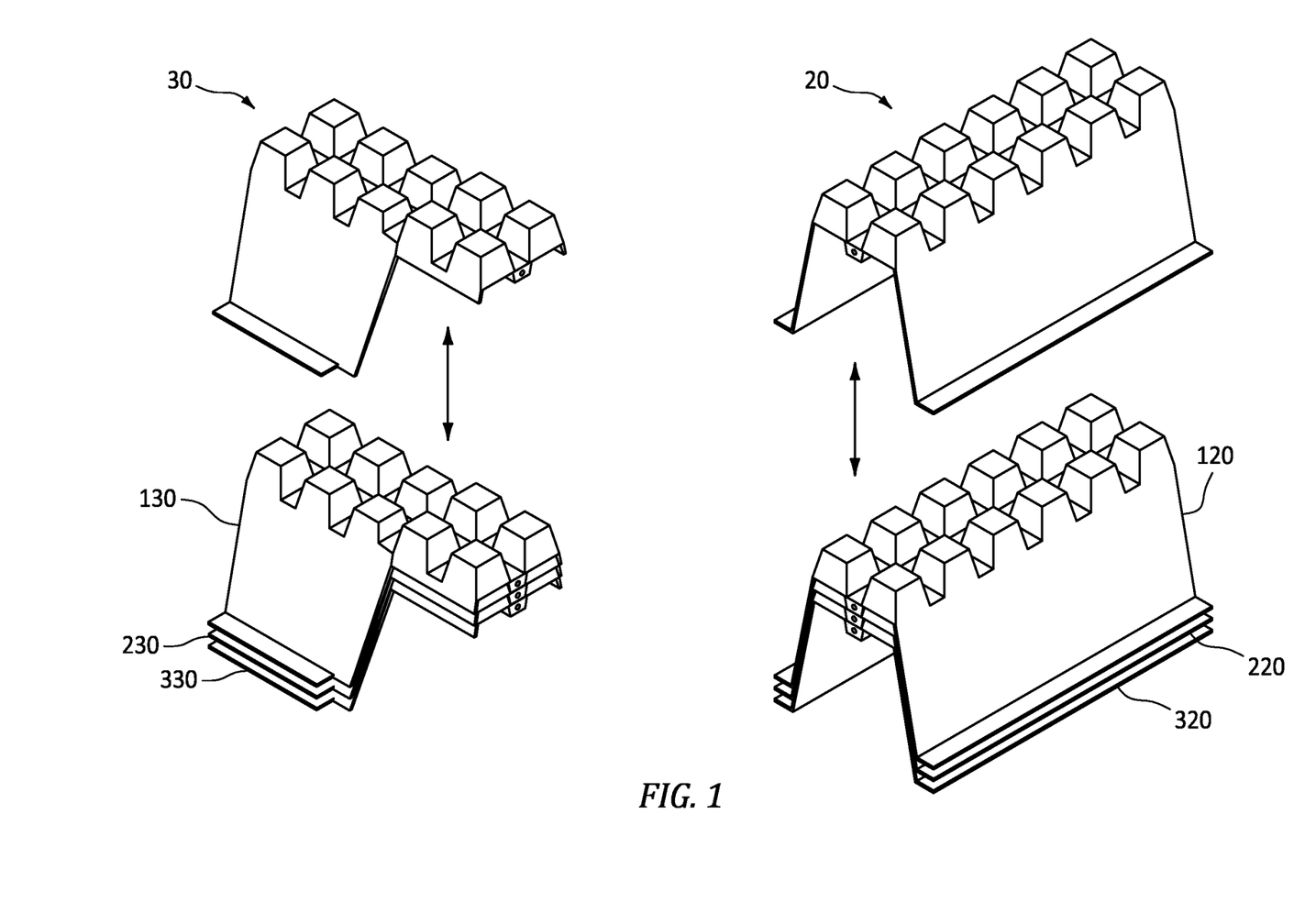
FIG. 1 is a disassembled view of the universal organizational system in the stowed and stacked orientation that is useful for understanding the inventive concepts disclosed herein.

As shown in FIG. 1, the organization system 10 can include, essentially, a plurality of straight divider segments 20, 120, 220, 320, etc., and a plurality of corner divider segments 30, 130, 230, 330, etc., that can be individually stacked for non-use storage and that can be removably joined together to form a plurality of different shapes for organizing cargo and other such items within a vehicle.

Figure 2A:
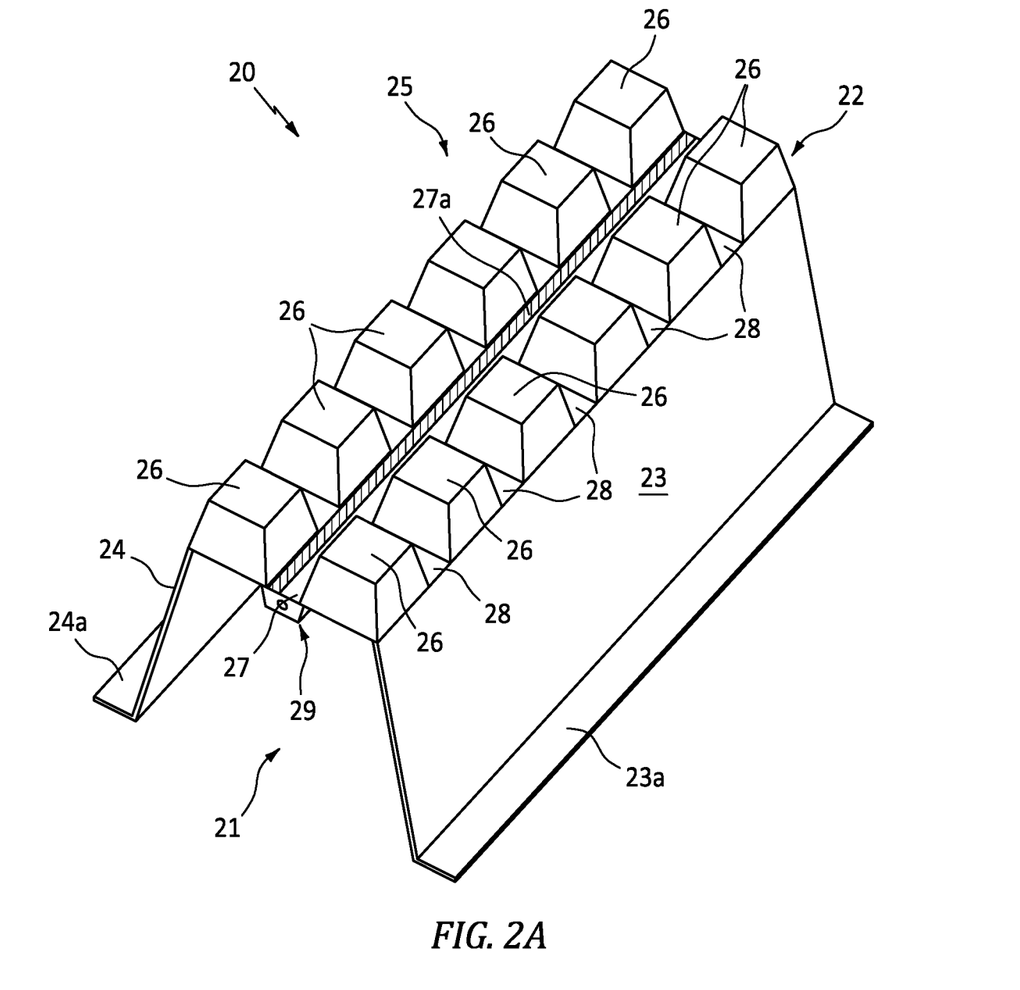
FIG. 2A is a top perspective view of one of the straight divider segments of the organizational system, in accordance with one embodiment of the invention.
Figure 2B:
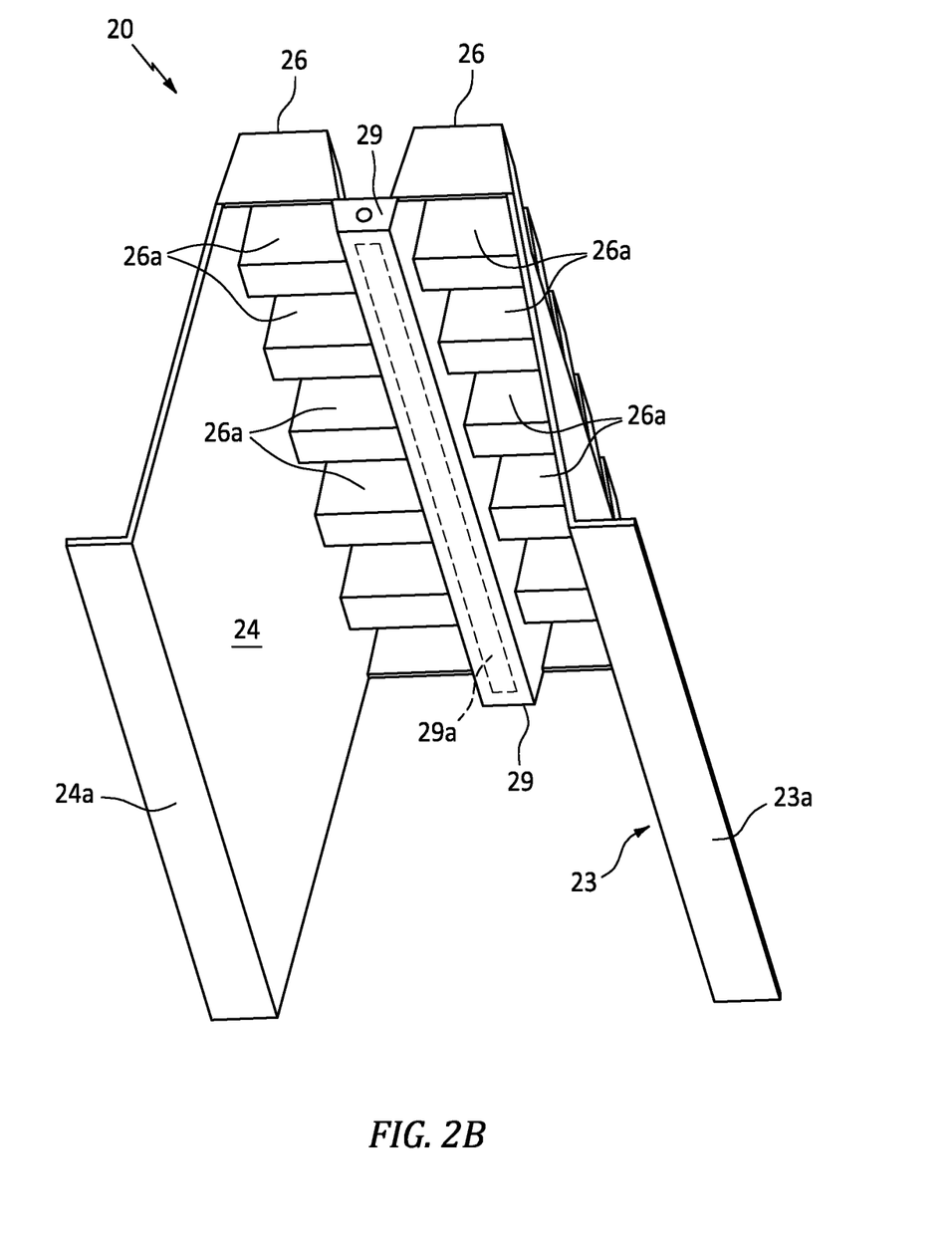
FIG. 2B is a bottom perspective view of one of the straight divider segments of the organizational system, in accordance with one embodiment of the invention.

FIGS. 2A and 2B illustrate one embodiment of a divider segment 20 of the system. As shown, each divider segment can include an elongated continuous body member having a first end 21, a second end 22, a pair of side walls 23 and 24, and a top end 25. Each of the side walls can include outward protruding edges 23a and 24a, along the bottom ends, and each side wall can preferably extend upward from the respective edges in an angular and/or generally orthogonal manner until merging with the top end.

As shown, a plurality of generally square and/or trapezoidal-shaped protrusions 26 can extend upward from the top surface. Each of the protrusions can be separated by an elongated central channel 27 that extends between the first and second ends 21 and 22, and a plurality of cross channels 28 that extend between the side walls 23 and 24 at a generally perpendicular angle to the central channel.

Each of the protrusions 26 can include an open bottom end 26a and can be hollow in nature to permit vertical stacking and connection of straight divider segments and corner divider segments 30 in the manner described below. Additionally, an elongated bar 29 can extend downward from the top surface at a location beneath the central channel 27 and can extend from the first end 21 to the second end 22. The bar 29 can include a shape and a size that is complementary to the shape and size of the central channel 27 to permit vertical stacking of the divider segments in the manner described below.

In one embodiment, a first connector 27a such as a metallic strip can be positioned within or along the central channel 27, and a second connector 29a such as a magnet can be positioned within or along the central bar 29. The first and second connectors can function to as a secondary means for maintaining the device components in the stacked and assembled orientations during operation. Of course, any number of other connectors and complementary connectors can be utilized herein.

As described herein, each straight divider segment 20 may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

Although described above with regard to a single straight divider segment 20, this is for ease of description, as the system can include any number of distinct and identical straight divider segments (e.g., 20, 120, 220, 320 . . . etc.) each of which having identical components and subcomponents as that described above with regard to element 20. Moreover, although described as a "straight" segment, other embodiments are contemplated wherein one or more of the segments includes a different shape such as a curve or bend and/or can be pre-formed into a specific shape such as a square, triangle, or the like, for example, so as to be connected with other segments in the manner described herein.

Figure 3A:
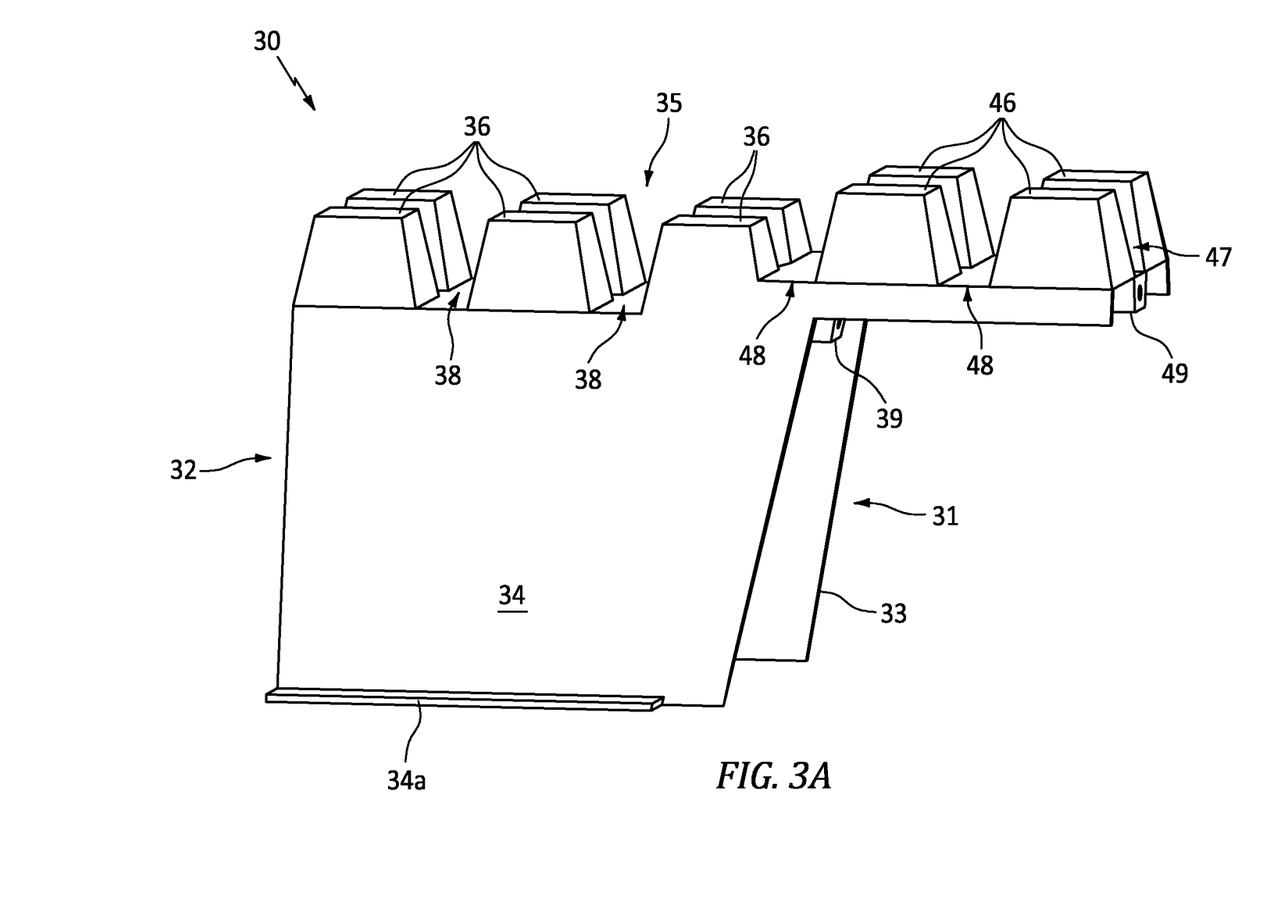
FIG. 3A is a side view of one of the corner divider segments of the organizational system, in accordance with one embodiment of the invention.
Figure 3B:
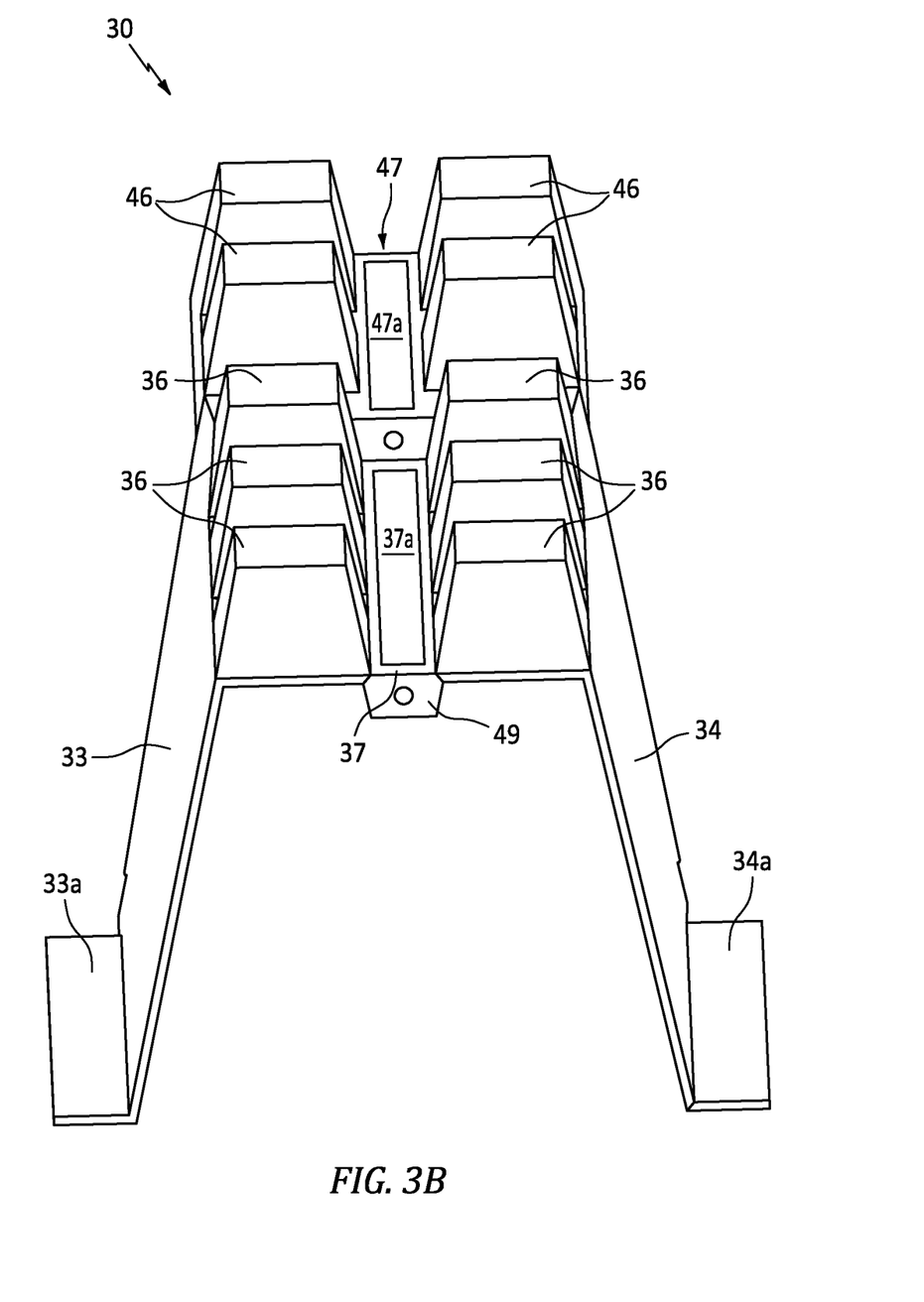
FIG. 3B is a front side view of one of the corner divider segments of the organizational system, in accordance with one embodiment of the invention.
Figure 3C:
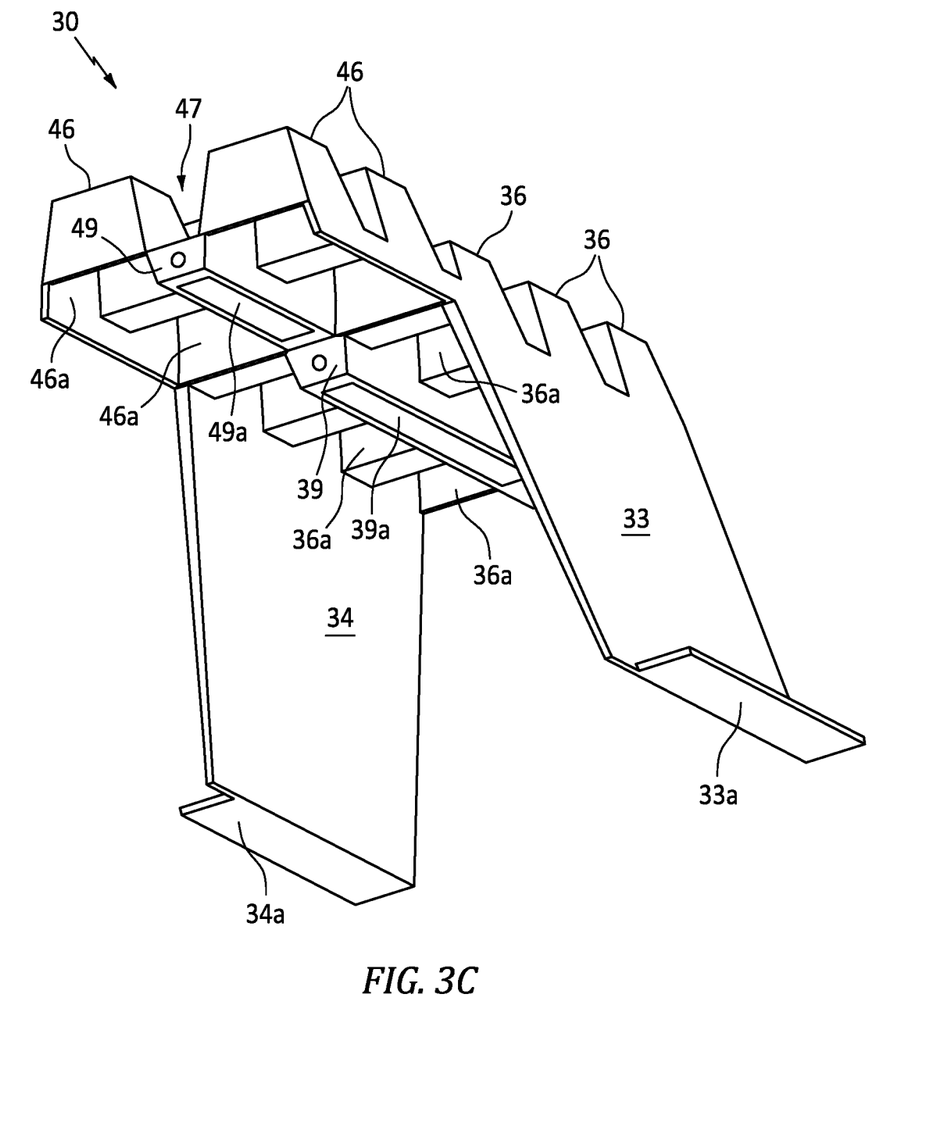
FIG. 3C is a bottom perspective view of one of the corner divider segments of the organizational system, in accordance with one embodiment of the invention.

FIGS. 3A-3C illustrate one embodiment of a corner divider segment 30 of the system. As shown, each corner segment can include an elongated body member having a first end 31, a second end 32, a pair of side walls 33 and 34, and a top end 35.

In one embodiment, each of the side walls can include outward protruding edges 33a and 34a, along the bottom ends, and each side wall can preferably extend upward from the respective edges in an angular and/or generally orthogonal manner until merging with the top end 35.

In one embodiment, the first end 31 formed by the leading edges of the side walls 33 and 34 can be angled such that the top portion of the first end extends outward beyond the bottom portion of the first end. In the preferred embodiment, the angle of the first end 31 will be complementary to the angle of the side walls 23 and 24 of the above-described divider segments 20, so as to allow the entire first end 31 of the corner segment to be positioned flush against either side wall of a straight divider segment when connecting thereto perpendicularly.

In one embodiment, a first plurality of protrusions 36 can extend upward from the top end 35 at a location above the side walls 33 and 34. Each of the protrusions can be separated by a first elongated central channel 37 that extends between the first and second ends 31 and 32, and a first plurality of cross channels 38 that extend between the side walls 33 and 34 at a generally perpendicular angle to the central channel 37.

In one embodiment, the top end can include an extended portion that projects outward beyond the first end 31. As shown, the extended portion of the top end can include a plurality of protrusions 46 that are separated by a second elongated central channel 47 that extends perpendicularly outward from the first end 31 and serially outward from the first channel 37. The extended portion can also include a second plurality of cross channels 48 that extend perpendicular to the second central channel 47 and parallel to each of the first plurality of channels 38.

As shown, each of the protrusions and channels 46-48 can be positioned higher than protrusions and channels 36-38, due to the angular arrangement of the first end 31, so as to permit the extended portion to engage the protrusions 26 on the top end of a divider segment 20 perpendicularly in the manner described below.

In either instance, each of the protrusions 36 and 46 can include an open bottom end 36a and 46a, respectively and can be hollow in nature. Likewise, a first elongated bar 39 can extend downward from the top end at a location beneath the first central channel 37, and a second elongated bar 49 can extend downward from the top end at a location beneath the second central channel 47 along the length of the bridge portion.

In one embodiment, additional first connectors 37a and 47a a such as metallic strips can be positioned within or along the central channels 37 and 47, respectively, and additional second connectors 39a and 49a such as magnets can be positioned within or along the central bars 39 and 49, respectively. The first and second connectors can function to as a secondary means for securing the corner segment 30 to one of the straight divider segments 20 during operation of the same. Of course, any number of other connectors and complementary connectors can be utilized herein.

As described herein, each of the protrusions 26, 36 and 46, along with the respective openings 26a, 36a and 46a can include identical shapes, sizes and separation distances so as to allow protrusions from one device 20 or 30 to engage the openings on another device 30 or 20. Likewise, each of the channels 27, 37 and 47 can include identical shapes and sizes as each other, and channels 28, 38 and 48 can also include identical shapes, sizes and separation distances as each other. Such functionality being necessary to permit vertical stacking for non-use storage, and vertical stacking and interconnectability in the manner described below.

As described herein, each corner divider segment 30 may be formed from the same materials described above with regard to the straight divider segments. Likewise, although described as a single corner divider segment 30, this is for ease of description, as the system can include any number of distinct and identical corner divider segments (e.g., 30, 130, 230, 330 . . . etc.) each of which having identical components and subcomponents as that described above with regard to element 30.

FIGS. 4-7 illustrate one embodiment of the system 10 in operation to form a user-customizable organizer for storing items within a vehicle or other location. As shown best at FIG. 4, a plurality of straight divider segments 20 and 120 can be positioned serially such that the first end of one segment is positioned adjacent to the second end of another. Next, a third divider segment 220 can be positioned above the adjoining segments 20 and 120 and lowered—see arrow a—until the protrusions 26 and 126 of the bottom segments are within the openings of the third segment 220 and the bar of the third segment is positioned within the central channels of the bottom segments 20 and 120 (i.e., stackingly engaged).

Figure 4:
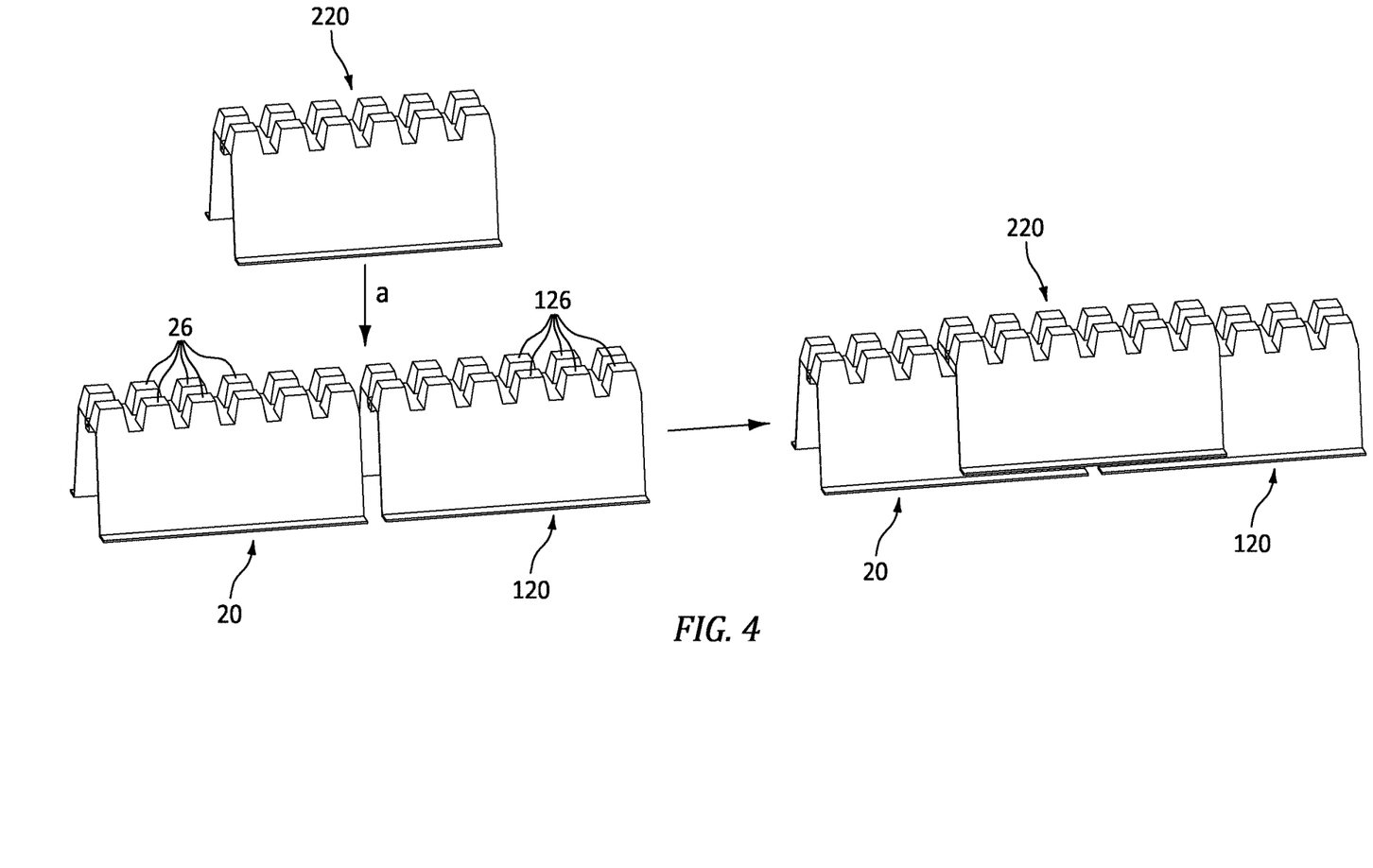
FIG. 4 is a side assembly view of the straight divider segments of the organizational system in operation, in accordance with one embodiment of the invention.

When so positioned, the connected divider segments form a wall that can be customized by a user to comprise any length, and can be stacked vertically to include any height. Moreover, the interlocking nature of the protrusions, openings, bar and channels will act as the primary mechanism for maintaining the segments 20, 120 and 220 together. Additionally, the attractive forces imparted by the magnets and metallic strips of the first and second connectors in each segment can act as a secondary means for keeping the segments together and to prevent inadvertent separation of the same.

Figure 5A:
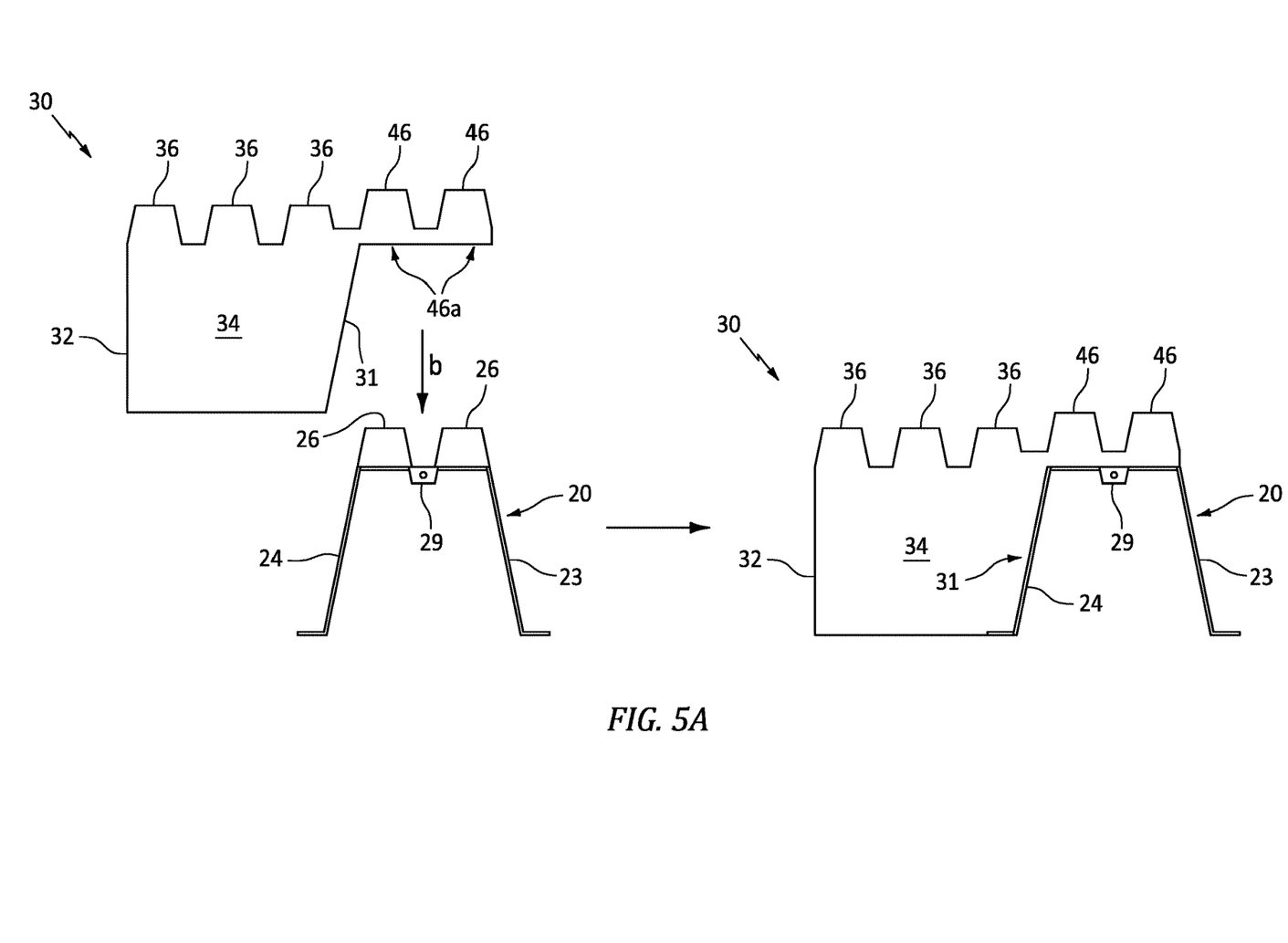
FIG. 5A is a side assembly view of the organizational system in operation, in accordance with one embodiment of the invention.
Figure 5B:
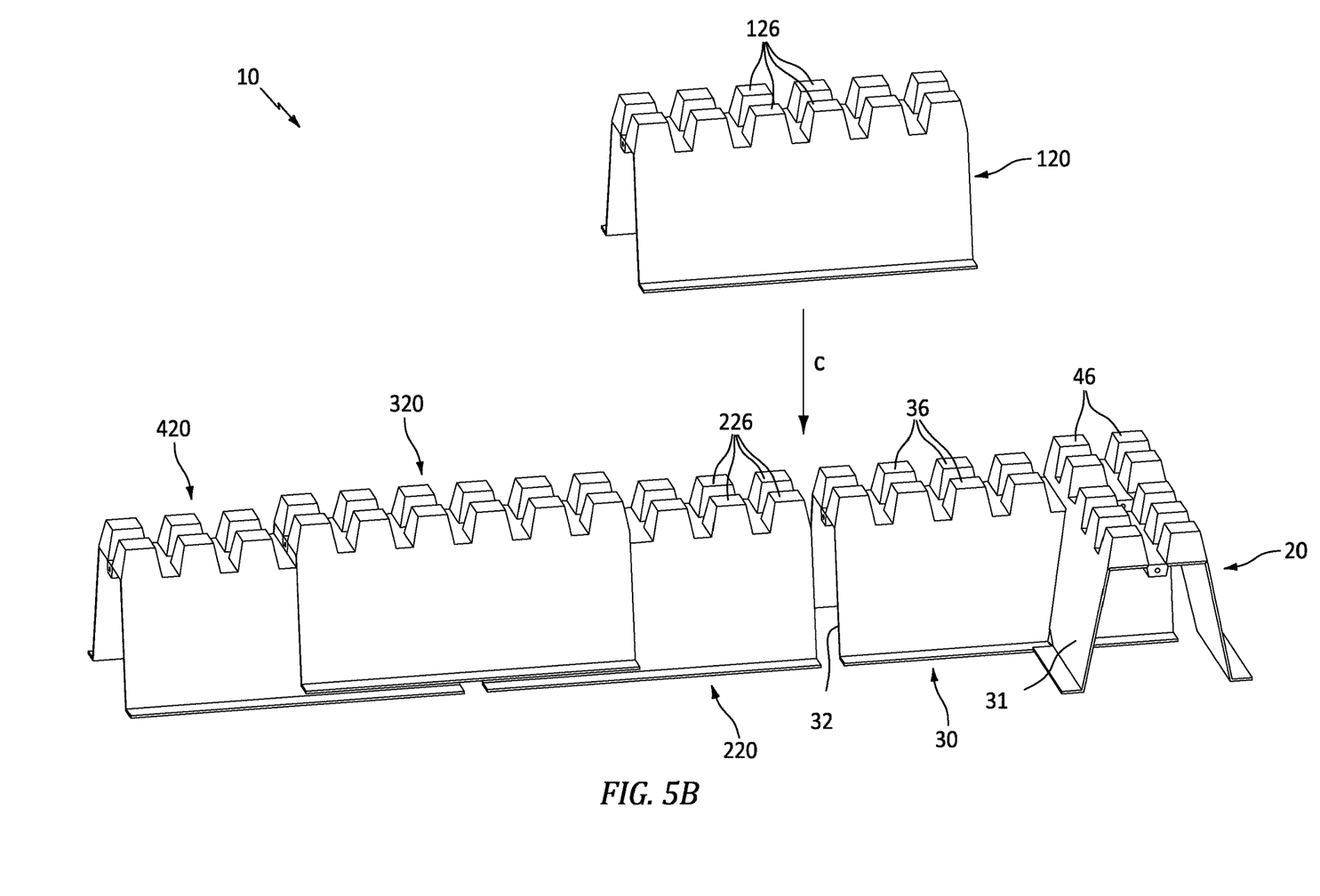
FIG. 5B is another side assembly view of the organizational system in operation, in accordance with one embodiment of the invention.

FIGS. 5A and 5B show one embodiment of connecting a corner segment 30 to a straight segment 20. As shown, the first end 31 of the corner segment can be positioned adjacent to one side 24 of the straight segment such that the protrusions 26 of the straight segment are positioned beneath the openings 46a on the extended portion of the corner segment.

Next, the corner segment can stackingly engage the straight segment whereby the corner segment is lowered—see arrow b—until the protrusions 26 are within the openings 46a, and the bar 49 is within one of the cross channels 38. When so positioned, the complementary angles of the first wall 31 and the selected sidewall 24 will allow the second end of the corner segment 32 to extend orthogonally outward from the side of the straight segment.

At this time, additional straight segments such as 220, 320 and 420 can be positioned adjacent to the second end 32 of the corner segment 30 and can be connected thereto by lowering another straight divider segment 120 onto the protrusions 36 and 226 of the adjacent segments 30 and 220.

Figure 6:
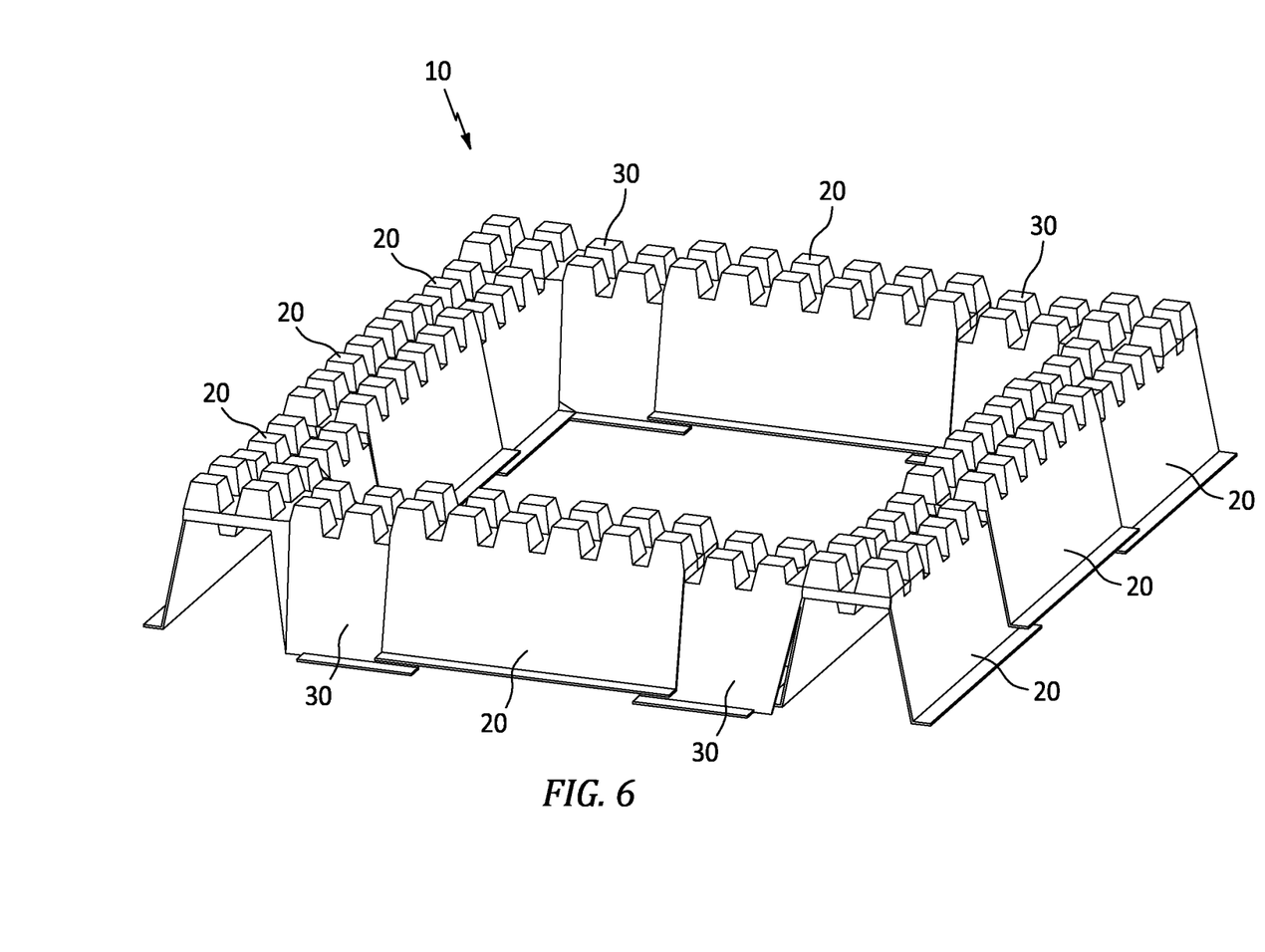
FIG. 6 is a perspective view of the organizational system in operation, in accordance with one embodiment of the invention.
Figure 7:
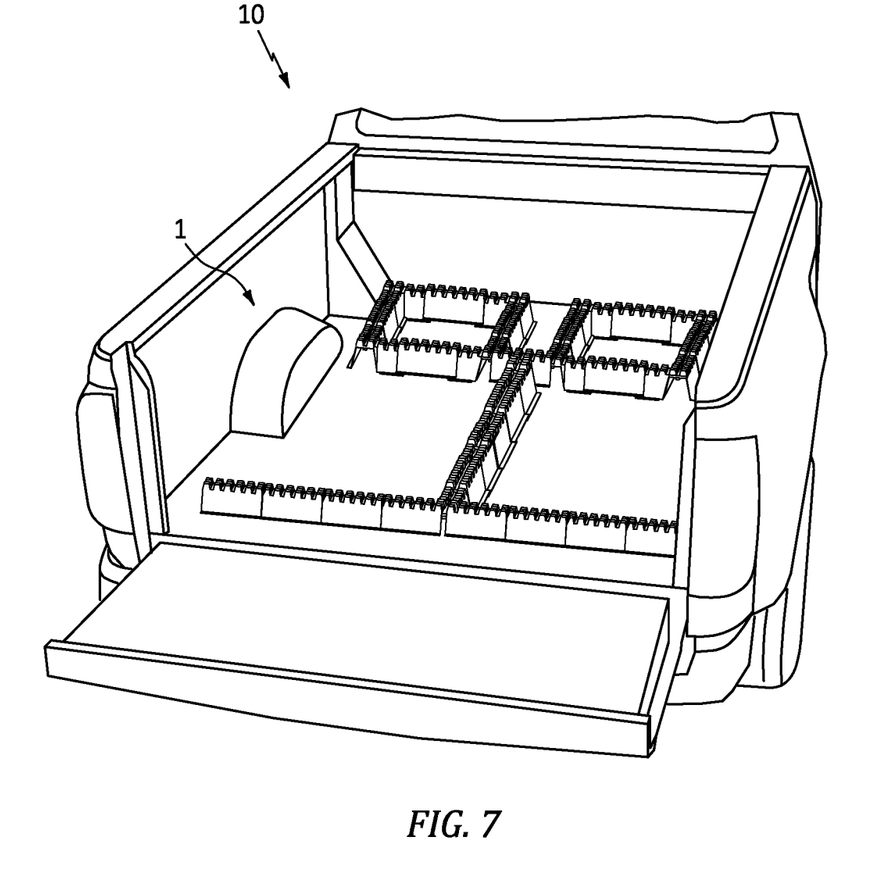
FIG. 7 is another perspective view of the organizational system in operation, in accordance with one embodiment of the invention.

As shown by FIGS. 6 and 7 the system 10 allows a user to connect any number of straight segments 20 and corner segments 30 together to create an organization system that is completely customizable for storing any number of different items having any number of different shapes and sizes within the cargo area 1 of a vehicle or other desired location.

As described herein, one or more elements of the universal organization system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An organizational system, comprising:
    a plurality of straight divider segments each having a first end, a second end, a pair of side walls and a top end;
    a first plurality of protrusions that are disposed along the top end of each of the plurality of straight divider segments, each of the first plurality of protrusions having an open bottom end and a hollow construction;
    a plurality of corner divider segments each having a first end, a second end, a pair of side walls and a top end; and
    a second plurality of protrusions that are disposed along the top end of each of the plurality of corner divider segments, each of the second plurality of protrusions having an open bottom end and a hollow construction,
    wherein each of the plurality of straight divider segments are configured to be aligned and secured together to form an elongated wall, and
    wherein each of the plurality of corner divider segments are configured to engage one of the plurality of straight divider segments.

2. The system of claim 1, wherein each of the plurality of straight divider segments further comprises:
    a first elongated channel that is disposed along the top surface and extending from the first end to the second end.

3. The system of claim 2, wherein each of the plurality of straight divider segments further comprises:
    an elongated bar that is disposed along a bottom end of the top surface and extending from the first end to the second end, said elongated bar being positioned directly beneath the first elongated channel.

4. The system of claim 3, wherein the elongated bar of one of the plurality of straight divider segments is positioned within the elongated channel of another of the plurality of straight divider segments when the plurality of straight divider segments are formed into the elongated wall.

5. The system of claim 4, wherein at least one of the first plurality of protrusions on one of the plurality of straight divider segments is positioned within the open bottom end of another of the first plurality of protrusions of another of the straight divider segments when the plurality of straight divider segments are formed into the elongated wall.

6. The system of claim 1, wherein the elongated wall comprises:
    a first group of straight divider segments of the plurality of straight divider segments that are aligned serially, and a second group of straight divider segments of the plurality of straight divider segments that are stackingly engaged to the first group.

7. The system of claim 1, wherein each of the plurality of corner divider segments are configured to stackingly engage one of the plurality of straight divider segments and to extend outward therefrom perpendicularly.

8. The system of claim 1, wherein the first plurality of protrusions of each of the plurality of straight divider segments are configured to engage the open bottom end of another of the first plurality of protrusions on another of the plurality of straight divider segments.

9. The system of claim 1, wherein the second plurality of protrusions of each of the plurality of corner divider segments are configured to engage the open bottom end of one of the first plurality of protrusions on one of the plurality of straight divider segments.

10. The system of claim 1, wherein the first plurality of protrusions of each of the plurality of straight divider segments are configured to engage the open bottom end of one of the second plurality of protrusions on one of the plurality of corner divider segments.

11. The system of claim 1, wherein each of the first plurality of protrusions and the second plurality of protrusions includes an identical shape and size.

* * * * *